United States Patent [19]
van der Wal et al.

[11] Patent Number: 5,516,498
[45] Date of Patent: May 14, 1996

[54] PROCESS FOR THE REMOVAL OF SULFUR DIOXIDE FROM GASES

[75] Inventors: Willem J. J. van der Wal, Utrecht; Eugéne G. M. Kuijpers, Apeldoorn; John W. Geus, Bilthoven, all of Netherlands

[73] Assignee: VEG - Gasinstituut N.V., Apeldoorn, Germany

[21] Appl. No.: 495,885

[22] Filed: Jun. 28, 1995

Related U.S. Application Data

[63] Continuation of Ser. No. 333,234, Nov. 2, 1994, abandoned, which is a continuation of Ser. No. 164,630, Dec. 7, 1993, abandoned, which is a continuation of Ser. No. 793,490, Nov. 13, 1991, abandoned, which is a continuation of Ser. No. 496,041, Mar. 16, 1990, abandoned, which is a continuation-in-part of Ser. No. 133,225, Dec. 11, 1987, abandoned, which is a continuation of Ser. No. 843,744, Mar. 25, 1986, abandoned.

[30] Foreign Application Priority Data

Mar. 29, 1985 [DE] Germany ............................ 3511521.1

[51] Int. Cl.$^6$ .................................................. B01D 53/50
[52] U.S. Cl. ................................ 423/244.02; 423/244.06; 423/541.1; 423/557
[58] Field of Search ..................... 423/244.02, 244.06, 423/557, 541.1

[56] References Cited

U.S. PATENT DOCUMENTS

| | | | |
|---|---|---|---|
| 3,832,445 | 8/1974 | Kouwenhoven et al. | 423/244 R |
| 4,113,658 | 9/1978 | Geus | 252/454 |
| 4,187,282 | 2/1980 | Matsuda et al. | 423/244 |
| 4,192,855 | 3/1980 | Ginger | 423/244 R |
| 4,258,020 | 3/1981 | Ginger | 423/239 |
| 4,459,370 | 7/1984 | van der Wal et al. | 502/258 |
| 4,478,800 | 10/1984 | van der Wal et al. | 423/244 R |
| 4,642,177 | 2/1987 | Mester et al. | 423/244 |

FOREIGN PATENT DOCUMENTS

| | | | |
|---|---|---|---|
| 2754393 | 6/1978 | Germany | 423/244 R |
| 3511521 | 1/1987 | Germany . | |
| 1176096 | 8/1968 | United Kingdom . | |
| 1160662 | 8/1969 | United Kingdom | 423/244 |

OTHER PUBLICATIONS

M. H. Cho and W. K. Lee. "$SO_2$ removal by CuO on gamma Alumina." Journal of Chem. Eng. of Japan (1983), vol. 16, pp. 127–131.
M. Satriana, "New Developments in Flue Gas Desulfurization Technology" (1981) Park Ridge: Noyes Data Corp., pp. 267–274.
Chemistry, Bailar et al., p. 421, 1978.
Bailar et al., Chemistry, 1978, p. 421.

Primary Examiner—Gary P. Straub
Assistant Examiner—Peter DiMauro
Attorney, Agent, or Firm—Schweitzer Cornman & Gross

[57] ABSTRACT

Process for the removal of sulphur dioxide from gases containing sulphur dioxide and oxygen, in which process these gases are brought into contact with a copper-containing acceptor which contains copper on a thermostable, inert support, the charged acceptor obtained is regenerated by terminating the contact with the gas containing sulphur dioxide and oxygen and thereafter bringing the charged acceptor into contact with a reducing gas, and the regenerated acceptor is again brought into contact with the gas containing sulphur dioxide and oxygen, the acceptor being charged with copper in such a quantity that the weight of copper amounts to more than 8% by weight, calculated as metallic copper and based on the total weight of the acceptor, and the copper is present in such a fine state of subdivision on the thermostable support that, present in its reduced form on the support, it has a specific surface area of more than 50 $m^2$ per gram of the metallic copper on the support.

5 Claims, 2 Drawing Sheets

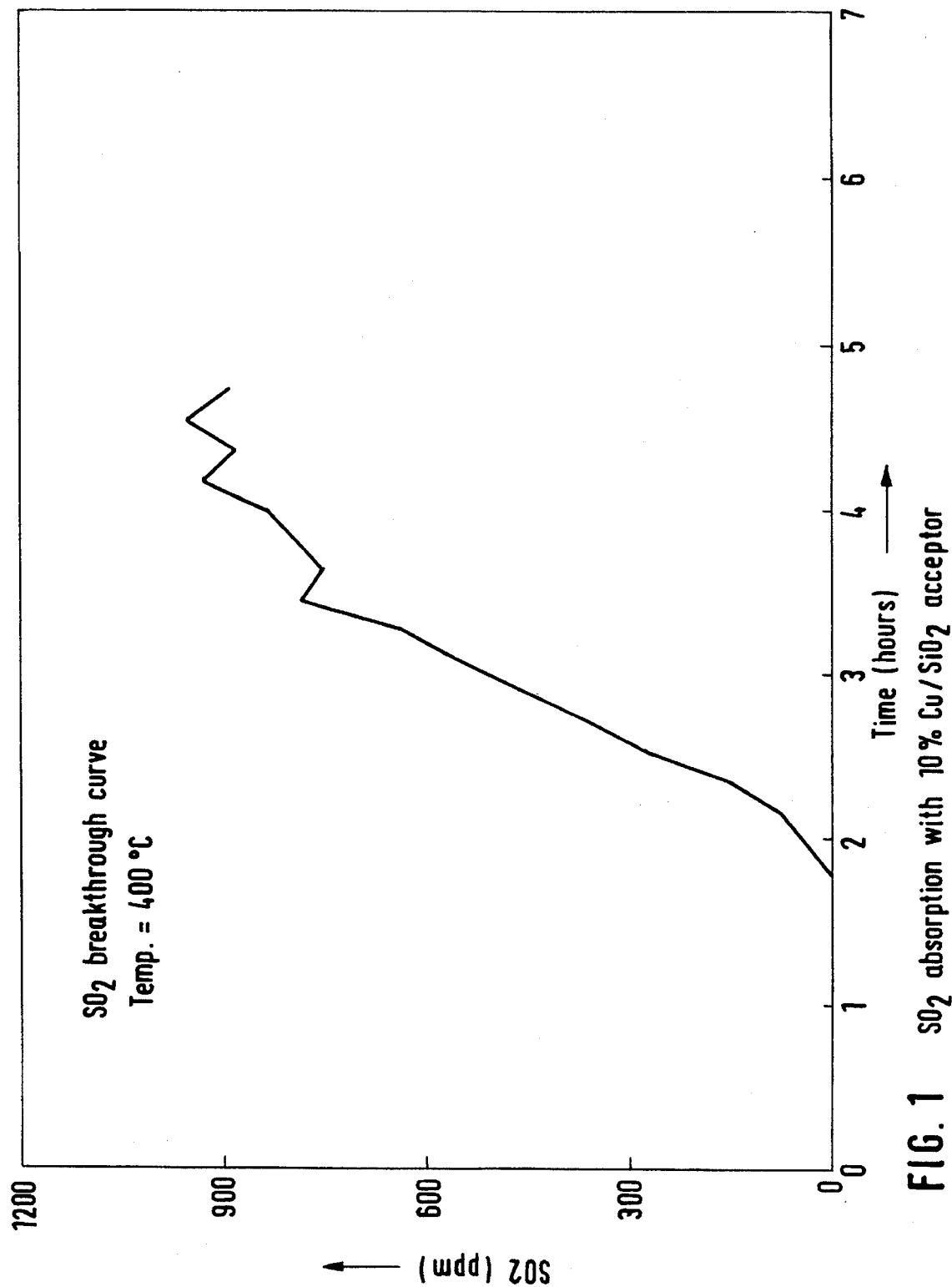
FIG. 1 SO₂ absorption with 10% Cu/SiO₂ acceptor

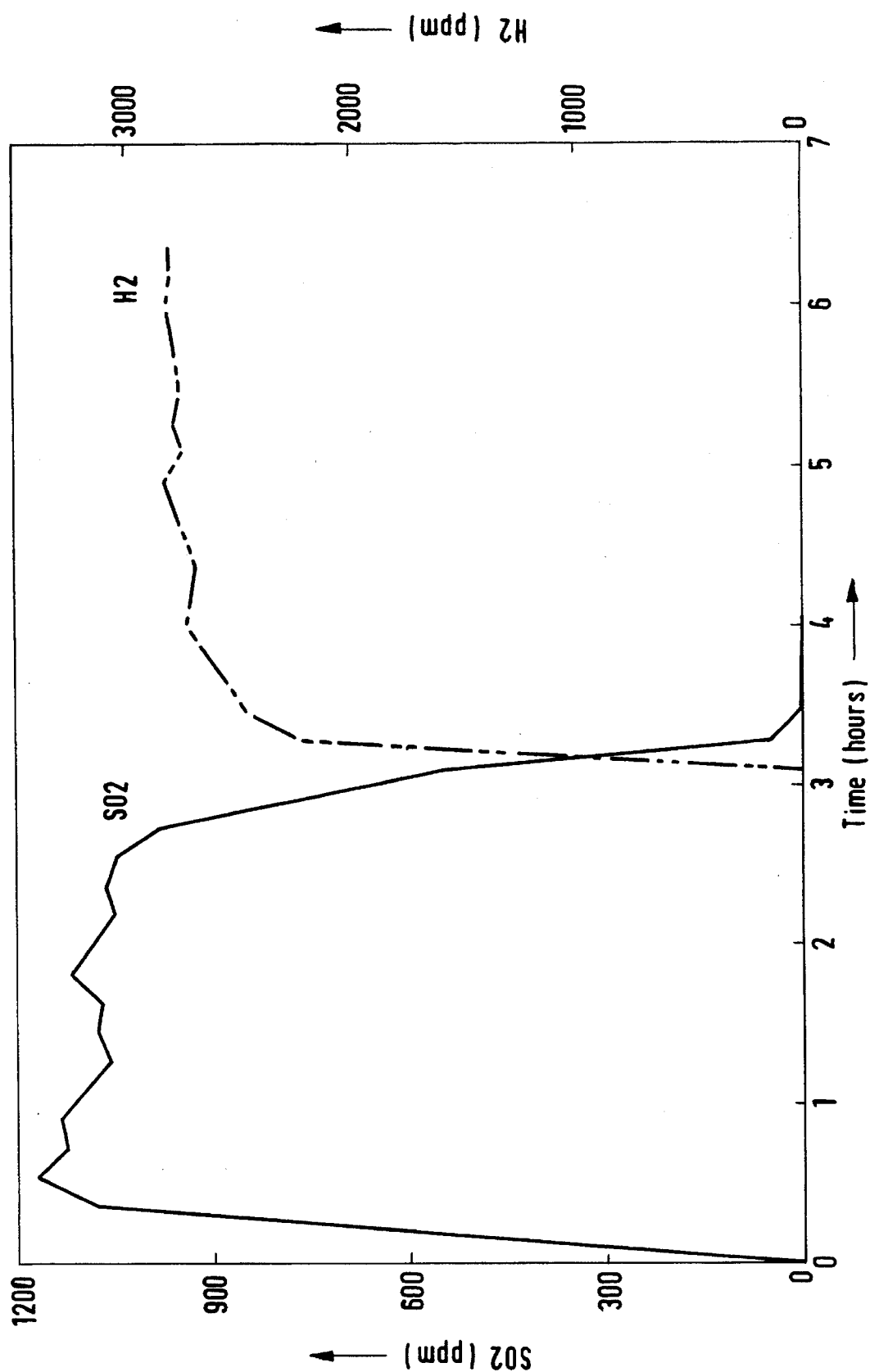
FIG. 2  Regeneration of 10% Cu/SiO₂
Temp. = 400°C

PROCESS FOR THE REMOVAL OF SULFUR DIOXIDE FROM GASES

This is a continuing application of U.S. Ser. No. 08/333,234, filed on Nov. 2, 1994; which is a continuation of U.S. Ser. No. 08/164,630, filed Dec. 7, 1993; which is a continuation of U.S. Ser. No. 07/793,490, filed Nov. 13, 1991; which is a continuation of U.S. Ser. No. 07/496,041, filed Mar. 16, 1990; which is a continuation-in-part of U.S. Ser. No. 07/133,225, filed Dec. 11, 1987; which is a continuation of U.S. Ser. No. 06/843,744, filed Mar. 25, 1986, all now abandoned.

This invention relates to a process for the removal of sulphur dioxide from gases containing sulphur and oxygen, in which process these gases are brought into contact with a copper-containing acceptor which contains copper on a thermostable, inert support, the charged acceptor obtained is regenerated by terminating the contact with the gas containing sulphur dioxide and oxygen and thereafter bringing the charged acceptor into contact with a reducing gas, and the regenerated acceptor is again brought into contact with the gas containing sulphur dioxide and oxygen.

In the combustion of fossil fuels such as coal, petroleum, etc., the sulphur compounds contained in these sources of energy are for the most part converted into sulphur dioxide. As is well known, the environmental pollution produced by this sulphur dioxide constitutes an enormous problem which has not yet been adequately solved. Power stations, technical combustion plants and chemical plants in which sulphur dioxide is released should therefore be provided with apparatus and processes for sulphur dioxide removal by which the emissions sulphur dioxide are removed as efficiently and simply as possible and at low cost. The technically most important processes to date for this purpose are the so-called wet processes, in which the sulphur dioxide is absorbed, e.g. in a suspension of calcium hydroxide or calcium carbonate in the presence of oxygen. In these processes, calcium sulphate (gypsum) precipitates from the solution and must be removed by some means. One considerable disadvantage of this process lies in the necessity of removing these large quantities of gypsum which are in most cases of poor technical quality and in turn give rise to considerable environmental problems due to their deposition and entail high costs.

The following processes have therefore been proposed:

Concentration of the $SO_2$, i.e. its removal from the waste gas in which it is present only at low concentrations, and the production of a stream of gas consisting predominantly of sulphur dioxide. This gas stream with high $SO_2$ content may be used, for example, in the Claus process or for the production of sulphuric acid. Another possibility lies in hydrogenation of the sulphur dioxide over suitable catalysts to form hydrogen sulphide. This can be converted with a high degree of specificity into elementary sulphur. This process avoids the use of the large quantities of liquid which are required in wet processes. Cooling of the waste gas is thereby obviated and the problem of removing gypsum is also overcome. If, as mentioned above, the $SO_2$ is converted into $H_2S$, it is important that the hydrogen sulphide should be obtained in a highly concentrated form since, for example, in the known Claus process, the processing of dilute streams of gas containing hydrogen sulphide may be technically disadvantageous and in some circumstances even impossible. Quite apart from this consideration it is, of course, advantageous if the streams of gas to be processed are as concentrated as possible as the consumption of energy required for heating and cooling is thereby reduced.

It is an object of the present invention to improve the process for the removal of sulphur dioxide from gases, which process entails the production of a stream of gas containing sulphur dioxide in a more highly concentrated or purer form or consisting almost entirely of sulphur dioxide. The solution to this problem should as far as possible fulfil the following requirements.

1. Selective removal of sulphur dioxide from the gas stream without unwanted side reactions.
2. The acceptor for sulphur dioxide should have as high an absorption capacity as possible.
3. The breakthrough curve should have a steep rise, i.e. the waste gas should be virtually free from sulphur dioxide up to the breakthrough point but thereafter the sulphur dioxide content in the waste gas should rise steeply.
4. Regeneration of the acceptor should be technically simple to carry out and efficient and the acceptor should be capable of withstanding a large number of absorption-regeneration cycles. The breakthrough curve of the gas used for regeneration should also be steep.
5. The acceptor should be thermostable under all conditions of the process.

The undesirable side reactions mentioned under number 1 include, for example, the formation of carbon deposits on the acceptor in cases when the treated gas contains carbon monoxide.

The high absorption capacity mentioned under number 2 denotes a high capacity for the uptake of sulphur dioxide by the acceptor while the stream of gas leaving the reactor which contains the acceptor has been virtually freed from sulphur dioxide, i.e. the sulphur dioxide concentration should if possible be less than 1 ppm. There exist, of course, absorption masses which are capable of binding relatively large quantities of sulphur dioxide when the sulphur dioxide concentration in the waste gas is relatively high. This is, of course, no technically satisfactory solution since the waste gas in that case still contains relatively large quantities of sulphur dioxide, which is, of course, undesirable. A high absorption capacity for sulphur dioxide on the part of the acceptor is therefore no clear indication of the technical usefulness of an acceptor unless the sulphur dioxide content in the waste gas of the absorption reactor is taken into account.

The steep breakthrough curve mentioned under number 3 is to some extent associated with the problem described above. If sulphur dioxide reacts very rapidly with the acceptor, it will be removed practically completely and virtually no sulphur dioxide will be found in the waste gas. It will thus be possible to make use of the entire theoretical absorption capacity of the acceptor up to the point in time when no longer tolerable partial pressures of sulphur dioxide are present in the waste gas. For the purpose of the present invention, the absorption capacity of the acceptor is defined as the molar ratio of sulphur dioxide to the copper contained in the acceptor at the moment when the sulphur dioxide concentration in the gas leaving the reactor rises above 1, ppm. This is an extremely stringent definition of the absorption capacity.

By "efficient regeneration of a copper-containing acceptor" mentioned under number 4 is meant basically that hydrogen or some other reducing gas reacts very rapidly with the copper sulphate particles formed from the absorbed sulphur dioxide to produce metallic copper or copper oxide and sulphur dioxide. The sulphur dioxide formed escapes with the stream of gas. It is, of course, economically particularly advantageous if a high proportion or, ideally, the total quantity of reducing agent present in the gas stream reacts with the charged acceptor until the acceptor contains substantially the whole quantity of copper in the form of metallic copper or copper oxide and virtually no reducing agent, in particular no hydrogen is left in the stream of waste gas during the process of regeneration. It is particularly when hydrogen is used as reducing agent that the stream of gas which has a high sulphur dioxide content should no longer contain hydrogen since unreacted hydrogen would have to be removed from the waste gas by elaborate methods of separation if the sulphur dioxide from the regeneration stage is to be worked up further by certain processes. If the waste gas contains highly concentrated or substantially pure sulphur dioxide (possibly in addition to an inert carrier gas), then the waste gas of the regeneration stage may subsequently be processed in conventional Claus apparatus, which is economically extremely attractive. If, however, the sulphur dioxide-enriched stream of gas obtained at the stage of regeneration contains a large quantity of hydrogen, the $SO_2$ and hydrogen must be separated by a process of cryogenic separation, which is very expensive, or the gas mixture may be passed over a Comox catalyst to form hydrogen sulphide from the two components. This may be economically unattractive since it uses up large quantities of hydrogen, which is an expensive substance.

The thermostability required according to number 5 is particularly important on account of the fact that the process is highly exothermic. Numerous problems would therefore arise if the acceptor were mechanically destroyed in use due to its being insufficiently stable in the heat.

The reactions occurring during absorption/regeneration are as follows:
Absorption: $CuO+SO_2+\frac{1}{2}O_2 \rightarrow CuSO_4$
Reduction (e.g.) $CuSO_4+2H_2 \rightarrow Cu+2H_2O+SO_2$
Reoxidation: $Cu+\frac{1}{2}O_2 \rightarrow CuO$ The gas is therefore required to have a sufficient concentration of oxygen during the absorption stage. Flue gases generally contain a sufficient quantity for this purpose.

In certain known processes with which it has been attempted to solve the given problem, an absorption mass containing copper on a thermostable support is used as acceptor. U.S. Pat. No. 3,957,952 describes the use of a copper acceptor which has an improved absorption capacity compared with that obtainable in the state of the art existing at the time. The support contains at least 30% by weight of aluminium oxide which is calcined at a temperature above 780° C. and impregnated with a solution containing cations of one or more of the metals, aluminium, magnesium, titanium and zirconium, either before or simultaneously with its impregnation with a solution containing copper cations. The aluminium, magnesium, titanium and zirconium must be present in an atomic ratio in the range of from 1:0.5 to 1:5 of the copper present in the solution. The support is impregnated with a solution containing one or more alkali metals; this impregnation may be carried out at the same time as or after the impregnation with the solution containing aluminium, magnesium, titanium and zirconium. As a result, the acceptor contains alkali metals on the support in a quantity of from 1 to 30% by weight of the total weight of acceptor. This acceptor has various disadvantages. One important disadvantage lies in the very gradual rise of its breakthrough curve. This disadvantage becomes all the more pronounced the more often the acceptor has been regenerated. Although the reported capacity is relatively high, it is difficult to use this capacity effectively because a gradually ascending breakthrough curve requires the use of large reactors with a large quantity of acceptor. This is, of course, uneconomical. Furthermore, it entails a high consumption of hydrogen in the process of regeneration since the gradually ascending breakthrough curve requires absorption to be stopped at a stage when the acceptor still contains a relatively large quantity of copper oxide. This copper oxide is then also reduced to metallic copper in the process of regeneration, and a correspondingly large quantity of hydrogen is wasted.

Another disadvantage lies in the low copper charge. The maximum charge is reported to be 15% by weight of copper. Yet another disadvantage lies in the relatively small temperature "window" for carrying out the process. It is said that this process can only be carried out at 350° to 475° C.

Another acceptor mass is described in U.S. Pat. No. 4,001,376. It also contains copper or copper oxide as active material while aluminium oxide (preferably gamma aluminium oxide) is used as the basis for the support material and an additional thermostable material is used, preferably titanium oxide or zirconium oxide in a quantity of about 2 to 20% by weight, based on the weight of the aluminium oxide. This acceptor mass is also prepared by impregnating the support with a copper nitrate solution and then drying and calcining it. The copper charge achieved is very low, even lower than that according to U.S. Pat. No. 3,957,952, and the specific absorption capacity is also low (mol of $SO_2$ per atom of copper). According to Table VII in column 14 of U.S. Pat. No. 4,001,376, the maximum utilization of copper achieved is only 26%. U.S. Pat. No. 4,039,478 of the same inventors describes a similar acceptor mass which also has a relatively low absorption capacity (below 26%). As already explained above, however, a high absorption capacity combined with a steep rise in the breakthrough curve for sulphur dioxide is essential if the process is to be carried out economically. When these requirements are fulfilled, it is sufficient to use smaller reactors with correspondingly lower investment costs and smaller quantities of acceptor. The costs of regeneration are also reduced. If the copper acceptor is regenerated with hydrogen., the copper sulphate formed is reduced back to metallic copper but any copper oxide present is also reduced to metallic copper. This means that not only the copper sulphate formed in the process but also unconverted copper oxide of the acceptor is reduced to metallic copper in the process of regeneration, and hydrogen is used up unnecessarily. In order that the copper-acceptor mass may then be used again for absorption, it is necessary to reoxidize the metallic copper to copper oxide in an atmosphere containing oxygen. This need not be carried out in a separate stage if the gas from which the sulphur dioxide is to be removed contains a sufficient quantity of oxygen. In that case, regeneration need not be followed by oxidation of the mass in a separate reoxidation stage to form copper oxide since the oxygen present in the gas to be treated oxidizes the copper to copper oxide at the absorption stage, and this copper oxide then again reacts with sulphur dioxide to form copper sulphate. After regeneration, therefore, it is sufficient if the regenerated mass is immediately put into the process according to the invention for the removal of sulphur dioxide, optionally with interposition of a process of scrubbing the reactor with an inert gas.

The conditions for these stages of the process must be so chosen that the original mechanical structure of the mass will not be destroyed. The copper particles must not cake together or sinter to form very large metal particles. Reduction and reoxidation may give rise to problems in this respect due to the exothermic nature of the reactions. If only a proportion of the copper oxide is converted into copper sulphate at the stage of absorption, the remaining copper oxide must be reduced to copper at the stage of regeneration, as already mentioned above, and must then be reoxidized to copper oxide. This, of course, amounts to an undesirably high consumption of reducing agent, which is uneconomical. The uneconomical nature of this process is brought out particularly clearly in Table 1 below, which shows the theoretically minimum quantities of hydrogen consumption required for several molar ratios of sulphur to copper, including that required for the optimum case in which the total quantity of copper oxide is converted into copper sulphate in the process of absorption of hydrogen sulphide.

TABLE 1

Hydrogen consumption in the regeneration of charged copper acceptors as a function of the molar $SO_2/CuO$ ratios at the end of the absorption stage.

| $SO_2$CuO molar ratio | 0.20 | 0.40 | 0.60 | 0.80 | 1.00 |
|---|---|---|---|---|---|
| relative hydrogen consumption | 3.00 | 1.75 | 1.34 | 1.13 | 1.00 |

These figures show particularly clearly that there is a great need for an acceptor mass which has a high capacity for the absorption of $SO_2$ and will not be destroyed even after numerous absorption-regeneration cycles, i.e. will continue to function effectively after many hundred cycles. Absorption masses based on copper oxide as active material which are capable of fulfilling these requirements even to a minor degree have not hitherto been known.

In the known processes it is not possible to obtain a substantially "pure" stream of sulphur dioxide from the process of regeneration.

The known regeneration processes with copper acceptors described above and hitherto employed in desulfurization of gases produced sulphur dioxide, hydrogen sulphide and copper sulphide, according to the reactions!
1) $CuSO_4 + 2H_2 \rightarrow Cu + SO_2 + 2H_2O$
2) $CuSO_4 + 4H_2 \rightarrow CuS + 4H_2O$
3) $2CuSO_4 + 6H_2 \rightarrow Cu_2S + 6H_2O + SO_2$
4) $Cu_2S + H_2 \rightarrow 2Cu + H_2S$ Reduction of copper sulphate via copper sulphides requires far more hydrogen per copper atom than direct reduction according to reaction 1. Reactions 2, 3, and 4 are therefore highly undesirable. It is a particular advantage of the process according to the invention that only direct reduction occurs during regeneration. (Flue Gas Desulfurization Pilot Study. Phase I Survey of Major Installations. Appendix 95-L Copper Oxide Flue Gas Desulfurization Process, NTIS, 1979.)

The formation of hydrogen sulphide is extremely disadvantageous because an extra and difficult purification step is required for the removal of this highly toxic compound in order to obtain pure sulphur dioxide. Evidently, this has a negative effect on the economy of the process. It is an extremely surprising and favorable effect of the process of the invention that very pure concentrated $SO_2$ obtained on regeneration.

In EP-A-71983 a regenerative process for the removal of sulphur compounds is described, in particular, the removal of $H_2S$ from reducing gases. There is no example for the removal of sulphur dioxide. In this process absorption masses are used which contain very small metal oxide particles with high specific surface areas.

Consider the effectiveness of the types of acceptors described in this publication and in view of the U.S. Pat. Nos. 3,957,952, 4,001,376 and 4,039,478, it seems obvious to use CuO absorption masses with very high specific surface areas in the removal of $SO_2$ from gases. However, the obviousness is only apparent. In EP-A- 71983 an experiment is described in which a CuO-acceptor with very small CuO particles is used in the removal of $H_2S$. Upon regeneration with oxygen sulphur trioxide was formed instead of sulphur dioxide. Copper, being a good oxidation catalyst, immediately oxidized sulphur dioxide to sulphur trioxide. The formation of sulphur trioxide, however, is very undesirable, because it is very corrosive, and because it is not retained by the absorbent.

Given the result of this experiment one would expect, that on passing a gas containing $SO_2$ over a CuO-mass containing very small CuO particles the $SO_2$ would be converted in $SO_3$, especially in oxidizing gases. Yet, the CuO absorption mass used in the process according to the invention does not catalyze this oxidation but very effectively removes $SO_2$ by forming $CuSO_4$, which is rather surprising. Another difference between the process of the invention and the process described in EP-A-71983 is that in EP-A- 71983 the regeneration is carried out with oxidizing gases, whereas the regeneration according to the invention is carried out with reducing gases, as will be explained in more detail hereinafter.

The present invention relates to a process in which the acceptor is charged with copper in a quantity such that the weight of copper amounts to more than 8% by weight, calculated as metallic copper and based on the total weight of the acceptor, and the copper is present in such a fine state of subdivision on the thermostable support that when present in its reduced form on the support it has a specific surface area of more than 50 m² per gram of metallic copper on the support.

The main feature of the acceptor used according to the invention is therefore that the copper situated on the thermostable support has an exceptionally high specific surface area, which in the context of the present invention means the surface area available to the gas phase. This specific surface area is measured when the copper is present in its reduced form as metallic copper. In order to obtain accurate measurements, the copper must exist virtually completely in its reduced form as metallic copper. Extensive and virtually complete reduction and measurement of the specific surface area of the reduced acceptor mass may be carried out, for example, in accordance with the following method: Reduction is carried out by passing a gaseous mixture of 10% hydrogen and 90% nitrogen over the acceptor while the acceptor is heated to 400° C. at a rate of 25 deg. cent. per hour. The gas mixture of hydrogen and nitrogen continues to be passed over the acceptor at this temperature for at least a further 5 hours. The acceptor is then cooled and flushed with nitrogen. The acceptor has now been pretreated for the determination of the specific copper surface area.

To determine the specific copper surface area of the reduced catalyst available to the gas phase, the following procedure first described by Scholten and Konvalinka (Trans. Farad. Soc. 65, 2465 (1969)) is carried out. The method is based on the dissociative chemisorption of dinitrogen monoxide in accordance with the equation $N_2O \rightarrow O(ads)+N_2$. The above mentioned authors have found that the rate of decomposition of dinitrogen monoxide decreases sharply after the adsorption of about one oxygen atom to two copper atoms on the surface. The rate of decomposition may be measured as follows: A sample of reduced catalyst is evacuated in a high vacuum apparatus. After evacuation, a small dose of $N_2O$ is added to the sample which is maintained at 90° C. After a certain (accurately known) length of time following the addition of $N_2O$, the pressure in the sample chamber, which is a known volume, is measured. The quantity of non-dissociatively absorbed dinitrogen monoxide can be calculated from the observed pressure drop. At the same time, the remaining gaseous $N_2O$ is condensed in a cold trap maintained at 77 K. The quantity of dissociatively chemisorbed dinitrogen monoxide can be determined from the pressure obtained, which is due to the presence of molecular nitrogen. Since the time of sorption is also accurately known, the velocity of dissociative chemisorption can easily be calculated. A fresh dose of $N_2O$ is then added to the sample and the process described above is repeated.

The rate of chemisorption decreases sharply after a number of doses. The total available copper surface area in the sample can be calculated from the integral quantity of $N_2O$ which has by then been taken up, assuming that each adsorbed oxygen atom corresponds to two copper atoms on the surface. The mean copper surface density (reciprocal value of specific surface area in $m^2$ per atom) is assumed to be $14.6 \times 10^{18}$ atoms/$m^2$.

These procedures are also described inter alia in the Dissertation by Johannes van der Meijden, University of Utrecht, Holland (1981). This dissertation also contains descriptions of processes for the preparation of thermostable supports charged with copper or copper oxide of the kind which may be used for the purpose of the present invention.

According to the present invention, it is preferred to use an acceptor in which the copper has a specific surface area of more than 60 $m^2$ per g, more preferred more than 80 $m^2$ per gram of metallic copper present in the acceptor.

It is particularly preferred if the specific surface area is greater than 90 $m^2$ per g of copper. The upper limit for the specific surface area is not particularly critical as it depends mainly on the upper limit that can be achieved in the preparation of the acceptor.

The high specific surface area is, of course, due to the fact that the copper is present in the form of extremely fine particles. These fine particles must of necessity be provided on the support in order that a large copper surface area according to the invention may be achieved. On the basis of the surprising results which can be achieved with such copper acceptors, it would appear that, compared with the state of the art discussed above, the extremely fine state of subdivision of the copper on the thermostable support is the cause for the excellent properties in the process according to the invention, that is to say, it is this fine state of subdivision of the copper in the process according to the invention which enables the sulphur dioxide to be so advantageously removed and the acceptor to be so advantageously regenerated and reused.

Many compounds which have a large specific surface area and are used in the state of the art for the preparation of catalysts or acceptors for absorbing sulphur dioxide may be used according to the invention as thermostable or refractory, inert supports. Silicon dioxide and alumina are preferred supports. It need not have received a special, additional treatment of the kind described, for example, in the above-mentioned U.S. Pat. Nos. 3,957,952 and 4,001,376.

Many suitable thermostable supports are available commercially and are manufactured in large quantities and in great variety for the preparation of many different kinds of catalysts. The silicon dioxides obtainable commercially under the Registered Trade Mark AEROSIL with specific surface areas of, for example, at least 200 $m^2$/g, most preferably at least 380 $m^2$/g are particularly suitable. Similarly, gamma-alumina has been found as most suitable.

The acceptors used according to the invention may contain extremely large quantities of copper as active component. The acceptor used according to the invention is advantageously charged with copper in a quantity corresponding to more than 10% by weight of copper, calculated as metallic copper and based on the total weight of the acceptor. The quantity of copper is advantageously above 10% by weight preferably above 16% by weight and most preferably above 25% by weight. This high copper charge results, of course, in acceptors which have an exceptionally high capacity, based on the total weight of the acceptor.

Processes for the preparation of acceptors used according to the present invention are described in detail in the above mentioned Dissertation by van der Meijden (page 60). In general, it may be stated that the acceptor used according to the invention is one which has been obtained by precipitating copper compounds at a pH of 3.5 to 6 from a dilute solution containing copper ions and the difficultly fusible oxidic support suspended in a finely divided form by reacting the solution with hydroxyl ions with heating and vigorous stirring over a relatively long period of time, the charged support being then separated from the solution, dried, calcined and reduced. The copper ions present in the dilute solution are derived from soluble copper salts such as copper nitrate, copper perchlorate, etc. The temperature to which the suspension is heated for precipitation depends upon the particular precipitation process employed. If precipitation is brought about by the decomposition of urea or by the hydroxyl ions thereby formed, the temperature is in the region of about 80° to 100° C. and in practice about 90° C. When other precipitation processes are employed, in which it is not necessary to indicate the temperatures for the decomposition of compounds giving rise to hydroxyl ions, the precipitation temperatures may be lower. Vigorous stirring is essential so that the particles of copper compounds precipitated on the support will be as finely divided as possible. The charged silicon dioxide is separated from the solution by conventional means, for example by filtration, and is calcined in the dry state at a temperature of at least about 350° C., preferably at least about 400° C. The upper limit is determined by the fact that the acceptor should not be inactivated, and is in practice about 700° C., preferably about 600° C. The length of time for which calcining is carried out is suitably 2 to 10 hours, preferably 5 to 6 hours.

There then follows a relatively direct reduction, using a gas containing hydrogen. This procedure does not require special safety measures. The temperature should be at least 200° C. and preferably at least 300° C. for rapid reduction. The upper limit is again determined by the fact that the acceptor should not be inactivated by the employment of excessively high temperatures. The upper temperature limit for reduction is in practice about 600° C., preferably about 550° C. and most preferably about 500° C. Reduction may be carried out within a relatively short time.

The copper acceptor is then reoxidized, preferably in air, before it is put into use (reoxidation is not always required, as explained above). The acceptor used according to the invention may also be prepared by a process which is a modification of the process for the preparation of a catalyst described in DE-C 1 767 202 and DE-A- 3 131 255. Instead of using the metal salts mentioned in the Examples of the said Patent Specification, which form the active component of the catalysts described there, it is necessary in the present case to use copper solutions, in particular copper nitrate solutions.

The removal of sulphur dioxide from gases, may be carried out at temperatures of 200° C. to 600° C., more preferably above 350° C. Optimum temperatures can be found by the one skilled in the art.

The sulphur dioxide content of the gases from which it is required to be removed may vary within wide limits. For example, sulphur dioxide may be as effectively removed from gases containing only 10 ppm to 1% of sulphur dioxide as from gases containing sulphur dioxide in quantities of up to 10% and even up to 20%.

If the gases produced from some technical process and from which sulphur dioxide is required to be removed do not contain sufficient oxygen to convert the copper oxide of the acceptor into copper sulphate, it is necessary to add a corresponding quantity of oxygen or of some other oxidizing agent supplying oxygen.

As may be seen from the examples, the acceptor may become extremely highly charged with sulphur dioxide in the process according to the invention, and the sulphur dioxide content in the waste gas remains extremely low until the acceptor is almost fully charged, namely below 1 ppm, which is almost below the limit of detection. This amounts to a degree of removal of sulphur dioxide from gases containing it which has not hitherto been considered possible. It is highly surprising that such an extremely desirable effect is achieved according to the invention.

Regeneration of the charged acceptor is carried out in known manner (see inter alia the Patent Specifications mentioned above). The acceptor which contains copper mainly in the form of copper sulphate after the absorption stage is first flushed with an inert gas, e.g. nitrogen, and then reduced with a reducing gas, e.g. a gas containing hydrogen or even pure hydrogen. The temperature during regeneration may lie within 100° to 500° C., preferably above 200° C., more preferably above 250° C. The acceptor of the invention is very insensitive to strong temperature fluctuations, i.e. it may be charged with sulphur dioxide and reduced again at either relatively low temperatures or relatively high temperatures.

Since virtually pure hydrogen may be used for regeneration or reduction and the hydrogen reacts almost completely with the charged acceptor to form virtually pure sulphur dioxide, regeneration results in a stream of almost pure sulphur dioxide mixed only with inert carrier gas when such a carrier gas is used. This stream of sulphur dioxide is eminently suitable for use for various known applications.

The examples serve to illustrate the invention.

In the preparation examples the acceptor used in the process of the invention is prepared according to the processes decribed in DE-C-1767202 and DE-A-3131255. However, it should be noted that the acceptor can be prepared by other methods known in the art also, like the combined precipitation of carrier and active metal and the hydrolysis is of KCNO.

The molar ratio of absorbed sulphur to copper of the catalyst should during absorption not exceed 0.9, preferably not exceed 0.8 and most preferably not exceed 0.7, because during absorption copper sulphate is formed which has a very low melting point. If the amount of copper sulphate is too high sintering may occur resulting in reduced performance of the catalyst in further cycles.

EXAMPLE OF PREPARATION 1

57.3 g of $Cu(NO_3)_2 \cdot 3H_2O$ are dissolved in 1.4 l of deionized water. The pH of the solution is adjusted to 2 by the addition of a few drops of nitric acid. 106 g of finely divided silica (AEROSIL 200V, Registered Trade Mark) are suspended in 1.5 l of deionized water and the pH of this suspension is adjusted to 2 by the same method. 40 g of urea are dissolved in 0.7 l of deionized water and the pH of this solution is similarly adjusted to 2.

The silicon dioxide suspension, the urea solution and the copper nitrate solution are introduced successively into a vessel having a capacity of 4.8 l which has previously been heated to 90° C. Deionized water is then added to make up the total volume to 4.5 l. The suspension is continuously and vigorously stirred. When precipitation has been completed, the charged support is separated from the suspension, washed, dried at 120° C. for 24 hours and then size reduced. 1 g of the acceptor which has been reduced to particles measuring about 0.8 mm is calcined in a nitrogen atmosphere, first for 2 hours at a temperature rising to 450° C. and then for 2 hours at 450° C.

The acceptor is then cooled to a temperature below 100° C. and reduced by passing a mixture of 10% hydrogen, remainder nitrogen, over it, first for 2 hours at a temperature rising to 450° C. and then for one hour at 450° C. The resulting acceptor contains about 10% by weight of metallic copper, based on the total weight of acceptor. The specific surface area of the copper available to the gas phase is about 85 $m^2$ per g of metallic copper, (the measurement was carried out by the method described above). After reduction, the acceptor is reoxidized by the passage over it of a stream of gas containing oxygen so that it may be used for the process according to the invention.

EXAMPLE OF PREPARATION 2

16.3 g of $Cu(NO_3)_2 \cdot 3H_2O$ are dissolved in 0.5 l of deionized water. The pH of the solution is adjusted to by the addition of a few drops of nitric acid. 10 g of finely divided silicon dioxide (AEROSIL) are suspended in 0.5 l of deionized water and the pH of the suspension is similarly adjusted to 2.

A vessel having a capacity of 1.5 l is now heated to 90° C. for precipitation. The silicon dioxide suspension is introduced and 300 ml of a urea solution containing 20 g of urea are then added. During the decomposition of urea, the pH is kept constant at 5 by automatic control devices and the injection of nitric acid. After the pH has been adjusted to 5, the copper nitrate solution is injected under the surface of the suspension at the rate of 0.4 ml per minutes. The suspension is at the same time vigorously stirred. After injection has been completed, the charged support is separated from the solution, washed, dried at 120° C. for 24 hours and then pelletized. 1 g of the acceptor is broken down into particles having a mean diameter of about 0.8 mm and calcined and reduced as described in Example of preparation 1. The acceptor contains 30% by weight of metallic copper, based on the total weight of the acceptor. The specific surface area is 91.0 $m^2/g$ of copper.

EXAMPLE 1

The behaviour of the copper oxide mass in a regenerative process for the separation of sulphur dioxide from a gas stream was tested in this experiment.

The acceptor used was prepared as described in Example of preparation 1. 15 g of the absorption mass having a volume of about 30 ml were introduced into a tubular quartz reactor having an internal diameter of 3.0 cm. The copper charge amounted to 10.0% by weight of the total weight of catalyst.

The absorbent was pretreated with a 10% (based on volume) oxygen-in-nitrogen gas mixture at a temperature gradually raised to 500° C.

After this preliminary treatment, the absorbent was cooled to 400° C.

A gas mixture consisting of 443 ppm of sulphur dioxide, 10498 ppm of oxygen, the remainder nitrogen, was passed over the absorption mass.

Sulphur dioxide was adsorbed quantitatively over a certain period of time. During this period, the concentration of sulphur dioxide in the gas leaving the adsorption reactor was less than 1 ppm.

The first signs of breakthrough occurred after 234 minutes. At that moment, the molar ratio of sulphur dioxide to copper was 0.65.

When the sulphur dioxide content in the gas leaving the adsorption reactor had risen to 100 ppm, the integral uptake of sulphur dioxide had risen to 0.75 mol per mol of copper in the absorption mass.

At 200 ppm $SO_2$ breakthrough, this ratio amounted to 0.82.

After complete breakthrough, the absorption mass was regenerated with an 1182 ppm hydrogen-in-nitrogen stream at 400° C. During the process of reduction, virtually no hydrogen was found in the gas leaving the reactor.

The breakthrough of hydrogen occurred with a very steep rise of hydrogen concentration with a simultaneous fall in the sulphur dioxide concentration.

After the hydrogen breakthrough, no sulphur dioxide was found in the gas leaving the reactor.

EXAMPLE 2

In this experiment, the behaviour of the copper oxide mass in a regenerative process for the separation of sulphur dioxide from a gas stream was examined.

The mass used was prepared in accordance with Example of preparation 2. 15 g of the absorption mass having a volume of about 30 ml were introduced into a tubular quartz reactor having an internal diameter of 3.0 cm. The copper charge amounted to 30% by weight of the total weight of catalyst.

The absorbent was pretreated with a 10% (based on volume) oxygen-in-nitrogen gas mixture at a temperature which was gradually raised to 500° C.

After this preliminary treatment, the absorbent was cooled to 400° C.

A gas mixture consisting of 443 ppm of sulphur dioxide, 10498 ppm of oxygen, the remainder nitrogen, was passed over the absorption mass.

The sulphur dioxide was absorbed quantitatively over a certain period of time. During this period, the concentration of sulphur dioxide in the gas leaving the absorption reactor was below 1 ppm.

At the first sign of a breakthrough, the molar ratio of sulphur dioxide to copper amounted to 0.45.

After complete breakthrough, the absorption mass was regenerated with an 1182 ppm hydrogen-in-nitrogen stream at 400° C. Virtually no hydrogen was observed in the gas leaving the reactor during the process of reduction.

The breakthrough of hydrogen occurred with a very steep rise of hydrogen concentration with a simultaneous fall in sulphur dioxide concentration. After the hydrogen breakthrough, no sulphur dioxide was found in the gas leaving the reactor.

EXAMPLE 3

The behaviour of the copper oxide mass in a regenerative process for the separation of sulphur dioxide from a gas stream was tested in this experiment.

A cylindrical stainless steel reactor having an internal diameter of 1.5 cm was filled up to a level of 17 cm with 30 ml of acceptor. This amount of acceptor contained 1.46 g copper. Pellet size varied between 1 and 1.4 mm.

The absorption mass was prepared according to preparation example 1. Activation was slightly different from the procedure described in preparation example 1.

After drying at 120° C. and size reduction, the mass was calcined in a nitrogen atmosphere, first for one hour at a temperature rising to 400° C. and then for two hours at 400° C.

The acceptor was then cooled to 100° C. end reduced by passing a mixture of 10% by volume hydrogen and 90% by volume nitrogen over it, first for one hour at a temperature rising to 400° C., then for twelve hours at 400° C. After reduction according to this procedure, the specific surface area of the copper available to the gas phase is about 85 m² per g of metallic copper and the copper content is about 10.2% by weight.

The reduced acceptor was not reoxidized prior to use.

A gas mixture consisting of 1000 ppm of sulphur dioxide, 30000 ppm of oxygen, the remainder nitrogen, was passed order the absorption mass at 400° C. with a space velocity of $10^4$ $h^{-1}$ and a linear gas velocity of 47 cm/s.

BRIEF DESCRIPTION OF THE DRAWINGS

In FIG. 1 the sulphur dioxide content of the gas leaving the reactor is plotted versus time.

For a certain period of time the sulphur dioxide concentration remained below the detection level.

The first sign of breakthrough occurred after 1.8 hour. At that moment, the molar ratio of sulphur dioxide to copper was 0.4.

When the sulphur dioxide content in the effluent gas had risen to 100 ppm, the integral uptake of sulphur dioxide had risen to 0.48 mol per mol of copper in the absorption mass.

At 200, 400 and 800 ppm sulphur dioxide breakthrough, this ratio amounted to 0.52, 0.57 and 0.64 respectively.

After complete breakthrough, the absorption mass was regenerated with a 3000 ppm hydrogen-in-nitrogen stream at 400° C. with a space velocity of $10^4$ $h^{-1}$ and a linear gas velocity of 47 cm/s.

In FIG. 2 both the sulphur dioxide and hydrogen content of the effluent gas are plotted versus time.

During the process of reduction virtually no hydrogen was found in the gas leaving the reactor.

The breakthrough of hydrogen occurred with a very steep rise of hydrogen concentration with a simultaneous fall in the sulphur dioxide concentration, almost immediately below the detection level.

The effluent gas does not contain $SO_3$ and not contain $H_2S$.

At the first appearance of hydrogen in the effluent gas more than 99% of the sulphur dioxide contained in the acceptor had been recovered.

During regeneration no hydrogen sulphide was detected in the gas leaving the reactor.

The known regeneration process es with copper acceptors described above and hitherto employed in desulfurization of gases produced sulphur dioxide, hydrogen sulphide and copper sulphide, according to the reactions
1) $CuSO_4 + 2H_2 \rightarrow Cu + SO_2 + 2H_2O$
2) $CuSO_4 + 4H_2 \rightarrow CuS + 4H_2O$ 3) $2CuSO_4 + 6H_2 \rightarrow Cu_2S + 6H_2O + SO_2$
4) $Cu_2S + H_2 \rightarrow 2Cu + H_2S$ Reduction of copper sulphate via copper sulphides requires far more hydrogen per copper atom than direct reduction according to reaction 1. Reactions 2, 3 and 4 are therefore highly undesirable. It is a particular advantage of the process according to the invention that only direct reduction occurs during regeneration. (Flue Gas Desulfurization Pilot Study. Phase I Survey of Major Installations. Appendix 95-L Copper Oxide Flue Gas Desulfurization Process, NTIS, 1979.)

The formation of hydrogen sulphide is extremely disadvantageous because an extra and difficult purification step is required for the removal of this highly toxic compound in order to obtain pure sulphur dioxide. Evidently, this has a negative effect on the economy of the process. It is an extremely surprising and favourable effect of the process of the invention that very pure concentrated $SO_2$ is obtained on regeneration.

EXAMPLE 4

The acceptor was prepared by mixing 100 g of a commercially available gamma-alumina powder (B.E.T. surface area 300 $m^2/g$) to incipient wetness with 290 ml of an aqueous solution of copper nitrate (146 g $Cu(NO_3)_2 \cdot 3H_2O$/l). The moistened carrier material was then dried at 120° C. and crushed to pellets varying in size between 1 and 1.4 mm.

A cylindrical glass reactor having an internal diameter of 2.6 cm, was loaded with 32 g of the dried and comminuted acceptor. The mass was calcined in a nitrogen atmosphere for one hour at a temperature rising to 400° C. and then for two hours at 400° C. The mass was then cooled in a nitrogen atmosphere to 100° C. and reduced by passing a mixture of 10 vol. % hydrogen and 90 vol. % nitrogen over it, for one hour at a temperature rising from 100° to 400° C. and then for twelve hours at 400° C.

After this procedure the reduced acceptor contains 10 wt. % metallic cooper. The specific surface area of the copper available to the gas phase, as determined by the $N_2O$ decomposition method, is 57 $m_2$ per g metallic copper.

A gas mixture of 462 ppm sulfur dioxide and 3 vol. % oxygen in nitrogen was passed over the acceptor at 400° C. with an actual space velocity of $1.1 \times 10_4/h$ and the superficial velocity of 0.3 m/s. The sulfur dioxide content in the gas leaving the reactor remains below the detection level of 1 ppm for 2.7 hours. At breakthrough the molar ratio of absorbed sulfur dioxide to copper was 0.31.

At 50, 100, and 200 ppm breakthrough, this ratio amounted to 0.46, 0.50 and 0.53, respectively.

With respect to regeneration characteristics the copper-gamma-alumina acceptor behaved identically to the copper-silica acceptors described in the previous Examples. During regeneration neither sulfur trioxide nor hydrogen sulfide was detected in the effluent gas.

We claim:

1. A process for the removal of sulfur dioxide from a combustion gas product of a fossil fuel which gas contains sulfur dioxide and oxygen, consisting essentially of:

(a) contacting said combustion gas with an acceptor consisting essentially of copper or copper oxide on a thermostable, inert silica support, the copper content, calculated as metallic copper, being over 16% by weight based on the total weight of the acceptor, the specific surface area of the copper in reduced form being at least 50 $m^2$ per gram as metallic copper; said acceptor being obtained by adding a compound capable of generating hydroxyl ions after heating in the presence of water, to a dilute water-containing solution containing copper ions and silica support suspended in a finely divided form; and precipitating copper compounds by reacting the solution with hydroxyl ions, said hydroxyl ions being provided by heating with stirring of said compound for a time sufficient to decompose said compound to give rise to hydroxyl ions, the copper charged support being then separated from the solution, dried, calcined and reduced; the resulting acceptor providing improved absorption of the sulfur dioxide from the gas without the substantial formation of $SO_3$, wherein substantially all of the sulfur removed from said gas is bound on said acceptor essentially as copper sulfate;

(b) continuing acceptor contact with the combustion gas product until the sulfur removing capacity of said copper is substantially exhausted, and then (c) regenerating the acceptor for reuse.

2. The process of claim 1, wherein said regenerating process for reuse of the acceptor comprises terminating contact between said acceptor and said combustion gas, and contacting the acceptor with a reducing gas until the copper of said acceptor is substantially ready for reuse.

3. The process according to claim 1, wherein the acceptor is charged with copper in such a quantity that the weight of copper is more than 25% by weight, calculated as metallic copper and based on the total weight of the acceptor.

4. The process according to claim 1, wherein the copper has a specific surface area of more than 60 $m^2$ per g of copper.

5. The process according to claim 1, wherein the copper has a specific surface area of more than 80 $m^2$ per g of copper.

\* \* \* \* \*